Patented May 20, 1930

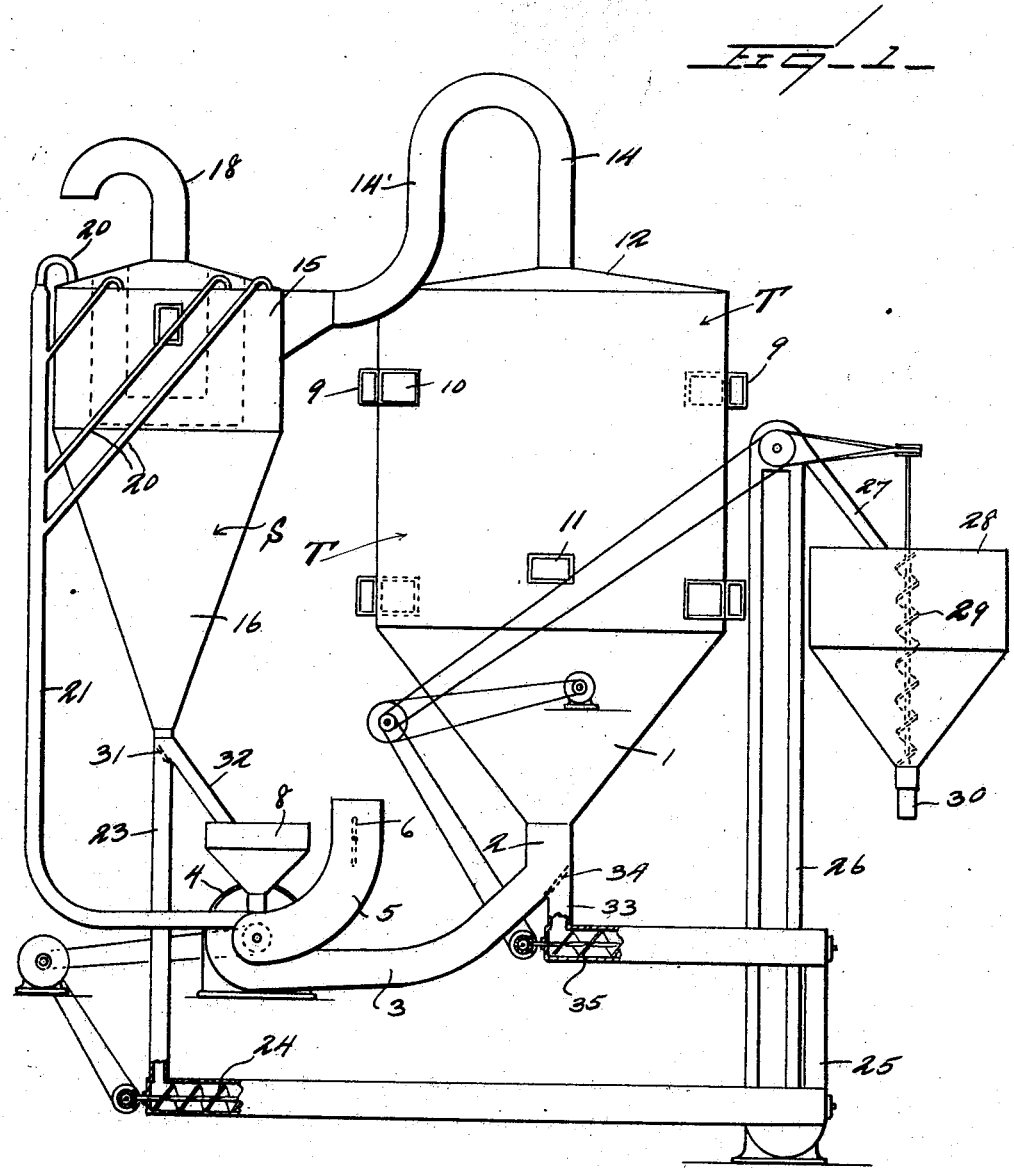

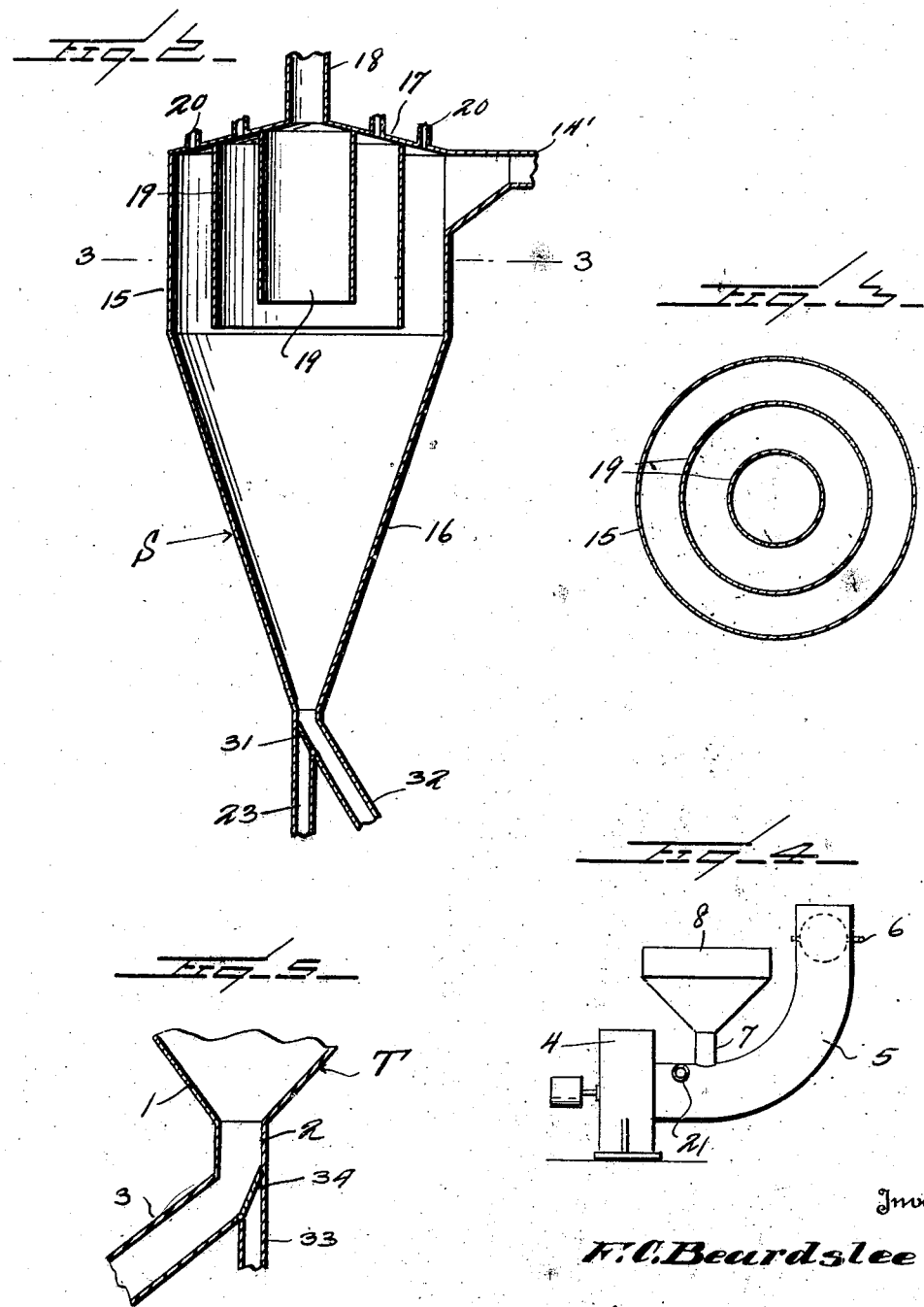

1,759,680

UNITED STATES PATENT OFFICE

FRANCIS C. BEARDSLEE, OF LOS ANGELES, CALIFORNIA, ASSIGNOR TO B. M. HUFFINE, J. I. HUFFINE, AND HIMSELF AS JOINT TRUSTEES

APPARATUS FOR TREATMENT OF FOODSTUFFS

Application filed February 21, 1928. Serial No. 256,003.

This invention relates to an apparatus for treatment of foodstuffs, and it is an object of the invention to provide an apparatus of this kind which serves to deliver the foodstuff for use or packing in a manner whereby the various ingredients are thoroughly and effectively commingled.

Another object of the invention is to provide an apparatus of this kind operating to thoroughly commingle the various ingredients comprised in the food composition and which also permits said ingredients to be subjected to the action of ultra violet rays to effect an anti-rachitic activation.

A further object of the invention is to provide an apparatus of this kind whereby the materials during treatment are effectively maintained in suspension and whereby such materials when in suspension are subjected to irradiation by ultra violet rays.

An additional object of the invention is to provide an apparatus of this kind wherein the materials to be treated are subjected to requisite motion by pneumatic means together with an arrangement to assure effective separation and collection of the materials after being treated.

The invention consists in the details of construction and in the combination and arrangement of the several parts of my improved apparatus for treatment of foodstuffs whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a diagrammatic view illustrating an apparatus constructed in accordance with an embodiment of my invention;

Figure 2 is a vertical sectional view taken through the separating tank as herein disclosed;

Figure 3 is a sectional view taken substantially on the line 3—3 of Figure 2;

Figure 4 is a fragmentary elevational view of the fan casing and showing the relative arrangement of the feed hopper and air intake;

Figure 5 is a fragmentary sectional view illustrating the communications at the lower portion of the irradiating tank.

As disclosed in the accompanying drawings, T denotes an irradiating tank of desired capacity and cylindrical in cross section, the lower portion 1 of said tank being conoidal with its apex downwardly disposed. In communication with the portion 1 at said apex is a depending spout 2 which is in communication with a conduit 3 leading in a conventional manner from the casing 4 of a conventional blast fan, said fan operating to force a blast of air through the conduit 3 and spout 2 into the irradiating tank T through the bottom thereof. Also in communication with the casing 4, preferably at the axial center thereof, is an air intake spout 5 flow of air through which being under control of a conventional valve 6. This spout 5 at a point preferably in close proximity to the casing 4 has in communication therewith a discharge spout 7 depending from a feed hopper 8 in which the various materials to be admixed or commingled are initially deposited.

The force of the air blast through the conduit 3 and into the tank T is sufficient to draw the materials within the hopper 8 into the tank T and to effectively maintain the same in suspension within the tank T and in agitation so that such materials may be subjected to irradiation by ultra violet rays projected within the tank T through the suitably positioned lamps 9. These lamps 9 may be of any type or character capable of producing ultra violet rays and it is to be understood that the tank T has associated with each of such lamps a window 10 of quartz glass or any other material permitting the effective passage of the rays.

In order that the action within the tank T during a working operation may be readily observed, I provide in the peripheral wall of the tank T, preferably adjacent to the bottom thereof, a sight window 11 which permits ready visual access within the tank.

The top 12 of the tank T, as herein disclosed, is substantially concavo convex with its convex face upwardly disposed and in communication with the tank T at the axial center of the top or head 12 is a carry-off pipe 14. This pipe 14 immediately adjacent to the tank T extends upwardly therefrom but is continued by a reverted portion 14' which is continued for communication within the upper portion of a separating tank S. The pipe 14 with its reverted portion 4' provides a gooseneck structure which has a tendency to initially bring into quiescence the force of the air blast as it passes upwardly through the tank T and out through the pipe line 14 so that when such blast enters the tank S its force is considerably reduced.

As herein set forth, the upper portion 15 of the tank S is cylindrical in form while its lower portion 16 is conoidal with its apex downwardly disposed. The top 17 of the tank S, as herein embodied, is also substantially concavo convex with its convex face upwardly directed and in communication with the tank S at substantially its axial center and through this top 17 is an air vent 18.

Arranged within the upper or cylindrical portion 15 of the tank S and concentric to each other and to said portion 15 are the cylindrical members 19. These members 19 depend from and have their upper ends closed by the top 17 of the tank S with the air vent 18 in communication through said top 17 with the central or inner member 19.

These members 19 are open at their lower ends with the central member having its lower end terminating above the lower end of the succeeding member 19 which in turn terminates slightly above the lower margin of the cylindrical portion 15 of the tank S. It is also to be noted that the members 19 are of pronounced varying diameters so that a relatively large space is provided between the members 19 surrounding the central member 19 and that the outer member 19 is of a diameter materially less than the diameter of the portion 15 of the tank S so that a material space is provided between said outer member 19 and the peripheral wall of the portion 15. It is also to be noted that the extension 14' of the pipe line has communication within the portion 15 of the tank S adjacent the top 17 thereof so that the air blast and its load entering the upper portion of the tank will come into direct contact with the upper portion of the outer member 19 and, as said blast whirls around said outer member 19, it will also enter within the space between the two members 19 and into the central member 19. This action serves to bring the air into a state of substantial quiescence so that the load carried by the air blast after it enters the tank S will readily drop by gravity to the bottom of the conoidal portion 16 thereof. In other words, the air and its load after entering the tank S are effectively separated, the load or materials dropping by gravity to the bottom of the tank S and the air entering within the central member 19 passing out through the vent 18 to the atmosphere.

To further assure the reduction of the air blast as it enters within the tank S being brought to a state of quiescence, I have in communication with the spaces between the outer member 19 and the peripheral wall of the portion 15 of the tank S and also with the space between the two members 19 the suction pipes 20 which lead to a common or manifold suction pipe 21. This pipe 21 leads to and is in communication with the air supply pipe 5 and at a point preferably between the fan casing 4 and the communication between the spout 7 of the hopper 8 and said supply pipe 5. By this assembly it will be noted that the action of the blast fan will serve to create suction within the pipe 21 and its branches 22 thereupon drawing out the air received within the upper portion 15 of the tank S, said suction, however, being insufficient to lift or carry off the ingredients conveyed into the tank S through the carry-off pipe 14 and its extension 14'.

The lower or apex end of the conoidal portion 16 of the tank S is continued by a discharge pipe 23 leading to a conveyor 24, herein disclosed as of a spiral type, and which is driven in any preferred or desired manner as is also true of the blast fan working in the casing 4. This conveyor 24 carries the materials discharged from the tank S to a boot 25. The materials received within the boot 25 are carried upwardly by a conventional elevator 26 driven as preferred, said elevator 26 delivering through a chute 27 within a mixing hopper 28. This hopper 28 at substantially its axial center is provided with a vertically disposed agitating member 29 preferably in the form of a spiral operating to lift upwardly materials within the central portion of the hopper 28 and thereby assuring an effective admixture or commingling of the various ingredients comprised in the food composition.

The lower portion of the mixing hopper 28 has leading therefrom a suitable discharge hopper 30 adapted to carry off the finished product to any point desired but more especially to facilitate packing.

The flow through the pipe 23 is under control of a swinging valve 31 which, when in open position with respect to the pipe 23, closes the flow through a branch pipe 32 herein disclosed as leading from the upper portion of the pipe 23. This branch pipe 32 leads to and discharges within the feed hopper 8 so that when desired and particularly during those periods when the flow through the pipe 23 is closed the separated food materials within the tank S will be returned to the feed hopper 8 and can be carried through the tank T.

In the event the action of the pneumatic means, as created by the fan within the casing 4, should become ineffective the materials remaining in the tank T may be readily removed therefrom through the branch pipe 33 depending from the conduit 3 at a point directly below the spout 2 and at which time admission of such materials within the conduit 3 is prevented by the adjusting of the swinging valve 34 into closed position with respect to the conduit 3. It is to be understood, however, that when the pneumatic means is properly functioning this valve 34 is moved or adjusted into a position to close any flow through the pipe 33.

The pipe 33 delivers to a suitably positioned conveyor 35 also preferably of a spiral type and driven in any desired manner and this conveyor 35 discharges into the boot 25 hereinbefore referred to so that the materials as removed directly from within the tank T through the pipe 33 will be properly delivered within the mixing hopper 28.

As the various movable parts of the apparatus as herein embodied may be driven in any preferred manner it is not deemed necessary to describe in detail the driving means as generally indicated in Figure 1 as it is believed this will be clearly apparent to those skilled in the art to which the present invention appertains.

An essential feature of the present apparatus resides in the effective manner in which the air is stilled or brought into substantial quiescence after entering the separating tank S as otherwise the effective separation of the food ingredients would be difficult to obtain and at the same time there is avoided any tendency of such materials or ingredients being caused by the air blast to be drawn a second time into the irradiating tank T.

The advantage of an apparatus of this kind resides in the fact that particular care must be exercised to assure the effective mixing or commingling of the various ingredients comprised in either poultry or dairy foodstuffs as otherwise the proper balance will not be obtained.

From the foregoing description it is thought to be obvious that an apparatus for treatment of foodstuffs constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus for mixing foodstuffs comprising a tank, a supply hopper, a conduit leading from the hopper to the tank, a fan for directing an air blast through the conduit into the tank, said blast being of sufficient force to draw the materials in the hopper into the tank and to maintain such materials in suspension and in agitation within the tank, a separating tank, a carry-off pipe leading from the upper portion of the first named tank and discharging within the separating tank, said air blast also carrying the materials through the carry-off pipe into the separating tank, means within the separating tank for bringing substantially into quiescence the air upon entering the separating tank to permit the materials carried into the separating tank by the air to readily separate therefrom, and a suction pipe leading from the separating tank to the conduit, the fan for creating the blast of air through the conduit also creating a suction through the suction pipe.

2. An apparatus for mixing foodstuffs comprising a tank, a supply hopper, a conduit leading from the hopper to the tank, a fan for directing an air blast through the conduit into the tank, said blast being of sufficient force to draw the materials in the hopper into the tank and to maintain such materials in suspension and in agitation within the tank, a separating tank, a carry-off pipe leading from the upper portion of the first named tank and discharging within the separating tank, said air blast also carrying the materials through the carry-off pipe into the separating tank, means within the separating tank for bringing substantially into quiescence the air upon entering the separating tank to permit the materials carried into the separating tank by the air to readily separate therefrom, and a suction pipe leading from the separating tank to the conduit, the fan creating the blast of air through the conduit also creating a suction through the suction pipe, the suction created within the suction pipe by said fan being insufficient to carry off the materials delivered within the separating tank.

3. An apparatus for mixing foodstuffs comprising a tank, a supply hopper, a conduit leading from the hopper to the tank, a fan for directing an air blast through the conduit into the tank, said blast being of sufficient force to draw the materials in the hopper into the tank and to maintain such materials in suspension and in agitation within the tank, a separating tank, a carry-off pipe leading from the upper portion of the first named tank and discharging within the separating tank, said air blast also carrying the materials through the carry-off pipe into the separating tank, means within the separating tank for bringing substantially into quiescence the air upon entering the separating tank to permit the materials carried into the separating tank by the air to readily separate therefrom, a suction pipe leading from the separating tank to the conduit, the fan for creating the blast of air through the conduit also creating a suction through the suction pipe, an air intake spout in communication with the conduit at a point adjacent to the fan, and a valve within the spout for controlling the flow therethrough.

4. An apparatus for mixing foodstuffs comprising a tank, a supply hopper, a conduit leading from the hopper to the tank, a fan for directing an air blast through the conduit into the tank, said blast being of sufficient force to draw the materials in the hopper into the tank and to maintain such materials in suspension and in agitation within the tank, a separating tank, a carry-off pipe leading from the upper portion of the first named tank and discharging within the separating tank, said air blast also carrying the materials through the carry-off pipe into the separating tank, means within the separating tank for bringing substantially into quiescence the air upon entering the separating tank to permit the materials carried into the separating tank by the air to readily separate therefrom, and a suction pipe leading from the separating tank to the conduit, the fan for creating the blast of air through the conduit also creating a suction through the suction pipe, the carry-off pipe being reverted to initially quiet the air as it passes therethrough and before entering the separating tank.

5. An apparatus for mixing foodstuffs comprising a tank, a supply hopper, a conduit leading from the hopper to the tank, a fan for directing an air blast through the conduit into the tank, said blast being of sufficient force to draw the materials in the hopper into the tank and to maintain such materials in suspension and in agitation within the tank, a separating tank, a carry-off pipe leading from the upper portion of the first named tank and discharging within the separating tank, said air blast also carrying the materials through the carry-off pipe into the separating tank, a series of nested members within the separating tank closed at their upper ends and open at their lower ends, said members intersecting the path of entry of the air blast within the separating tank, an air vent in communication with the central member, and a suction pipe in communication with the space surrounding each of said nested members, said suction pipe also being in communication with the conduit, the fan for forcing the air blast through the conduit also creating a suction through said pipe.

In testimony whereof I hereunto affix my signature.

FRANCIS C. BEARDSLEE.